March 31, 1936.　　　F. M. MOODY　　　2,035,822
ANTISKID MECHANISM FOR VEHICLES
Filed March 4, 1935　　　2 Sheets-Sheet 2
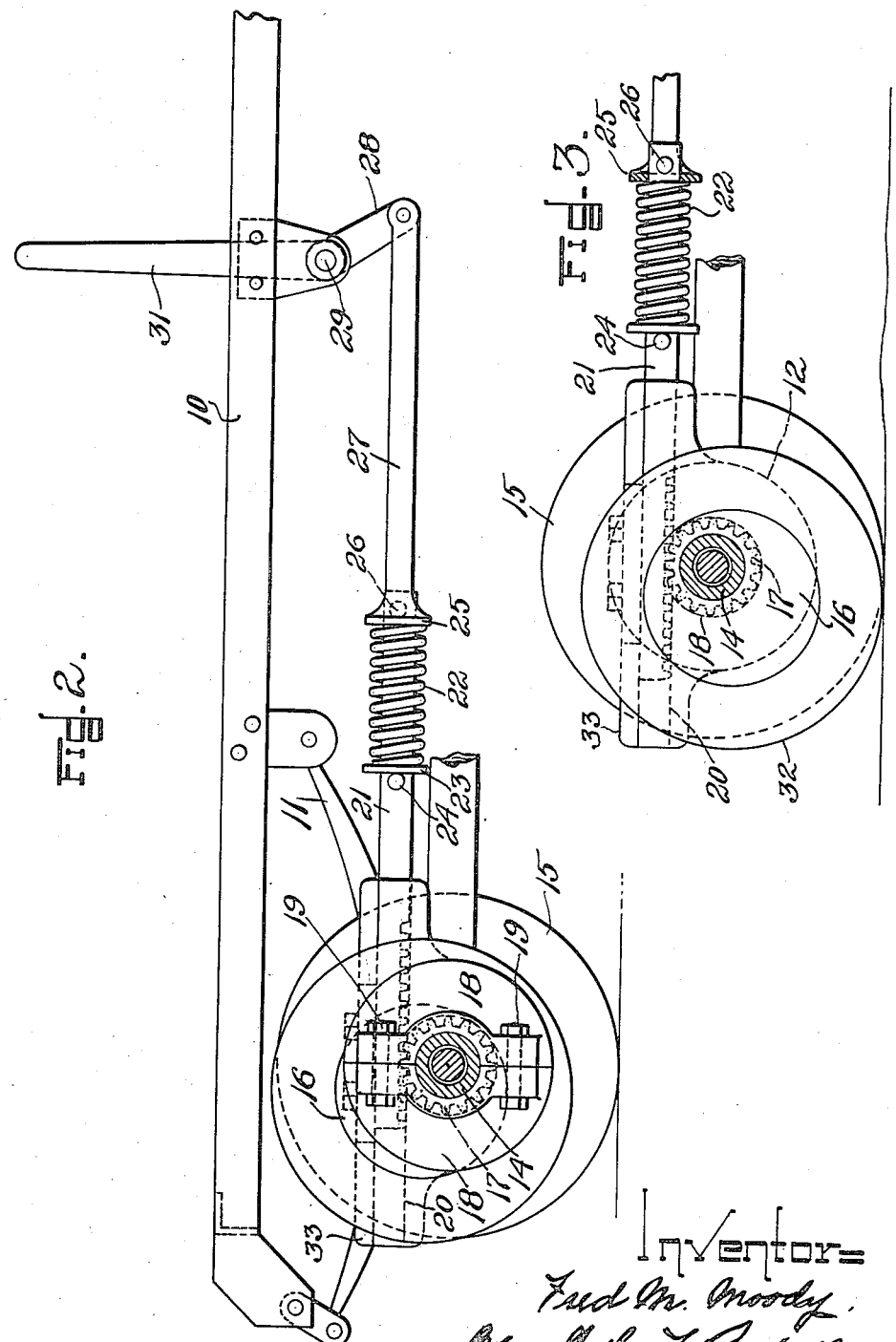

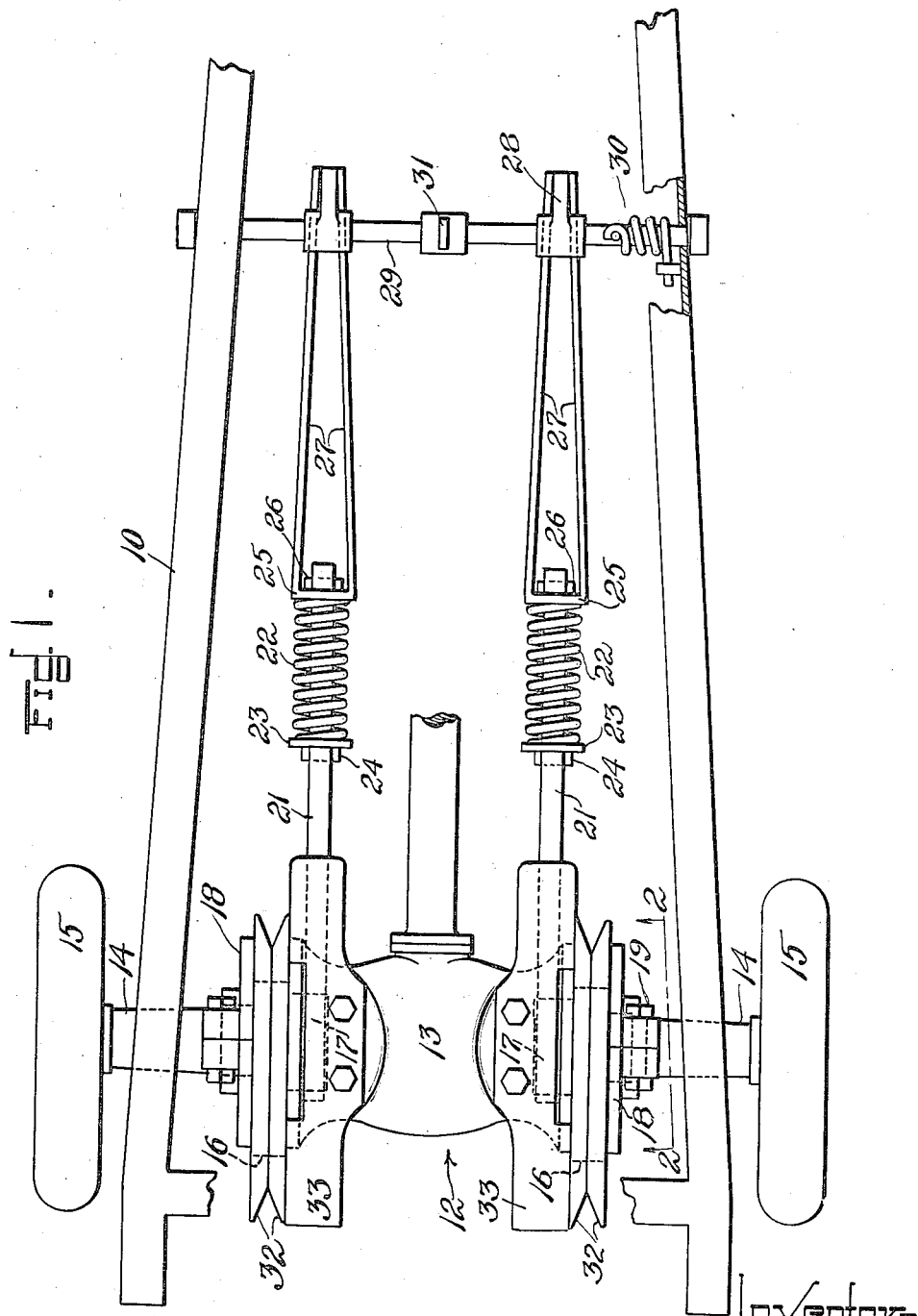

Patented Mar. 31, 1936

2,035,822

UNITED STATES PATENT OFFICE 2,035,822

ANTISKID MECHANISM FOR VEHICLES

Fred M. Moody, Whitman, Mass.

Application March 4, 1935, Serial No. 9,203

2 Claims. (Cl. 188—5)

My invention relates to vehicles, particularly automobiles, and has particular reference to anti-skid mechanism therefor.

The object of the invention is to provide a simple, inexpensive and efficient anti-skid mechanism for automobiles which mechanism will be normally maintained in operative but may be quickly thrown into service or action at will by the driver of the vehicle to prevent skidding of the latter.

To this end I have provided an improved anti-skid mechanism having the features of construction and operation set forth in the following description, the several novel features of the invention being separately pointed out and defined in the claims at the close thereof.

In the accompanying drawings:—

Figure 1 is a top plan view of a portion of the rear end of an automobile constructed in accordance with my invention.

Figure 2 is a section on line 2—2 of Fig. 1 showing the anti-skid mechanism in its inoperative retracted condition.

Figure 3 is a fragmentary elevation, partly in section, showing the anti-skid mechanism adjusted to prevent skidding.

In the accompanying drawings, 10 represents the chassis frame of an automobile, said frame being connected through the usual springs 11 with the rear axle-housing that is indicated generally at 12. This housing is made with a central enlarged portion 13 which, as usual, provides a chamber for the differential gearing forming part of the rear axle structure. The two shafts of the axle occupy tubular end portions 14 at opposite sides of the central portion 13 and each has fixed on it one of the rear wheels 15.

Each tubular end portion 14 of the axle housing is constructed adjacent to the proximate side of the central portion 13 with a journal bearing on which is rotatably mounted an eccentric 16 that is compounded with a gear 17 occupying a recess or chamber 18, Fig. 3, formed in said central portion 13.

Each eccentric 16 is held against axial movement on the housing in one direction by the central portion of the latter and against axial movement in the opposite direction by a collar 18.

Each collar 18 is made up of two segments which are connected and clamped tightly on its end portion 14 of the housing by means of a pair of bolts 19.

Adjacent to each side thereof the central portion 13 of the axle housing is made upon its top with a groove 20, Figs. 2 and 3, which communicates with the proximate gear chamber 18 and which is occupied by a rack-bar 21 formed upon its bottom side with teeth meshing with the gear 17 of said chamber. Thus it will be clear that endwise movement of the two rack-bars 21 will cause each of the latter to rotatively adjust its gear 17 and eccentric 16. Each rack-bar 21 is held within its groove 20 by a cap-plate 33 removably fastened by screws to the top of the axle housing.

Each rack-bar 21 has mounted upon its forward end a coiled spring 22 whose rear end bears against an abutment collar 23 which in turn bears against a pin 24 carried by the rack-bar.

The forward end of each spring 22 bears against a collar 25 slidably mounted upon its rack bar 21 and this collar is normally held by its spring against a stop pin 26 carried by the rack bar.

Each collar 25 is provided with a pair of forwardly extending side arms 27 whose forward ends embrace and are pivotally connected with an arm 28 fast on a transverse rock-shaft 29 journaled in bearings provided on chassis frame 10.

Normally the rack-bars 21 are yieldingly held at the limit of their forward movements by a coiled spring 30 mounted on rock-shaft 29, one end of said spring being connected with the rock-shaft and the opposite end with the chassis frame 10.

The rock-shaft 29 also has fixed on it an upstanding arm 31 which is located so that it is within the reach of the driver of the vehicle.

Each eccentric 16 has loosely mounted upon it two rings 32 each of which may, as shown, be made with an outer marginal portion that is sharpened to provide an annular knife-edge for engagement with the ground. These rings 32 are free to rotate on the eccentrics so that the latter serve as journals for the same.

Normally the eccentrics 16 are maintained in elevated positions with their rings out of engagement with the ground and well above the latter.

When the anti-skid mechanism is to be thrown into action the driver shoves forward on the arm 31 thereby forcing the collars 25 rearwardly and the latter act through springs 22 and abutments 23 to force the rack-bars 21 rearwardly. This rearward movement of the rack-bars acts through the gears 17 to swing eccentrics 16 downwardly on the axis of the housing until the rings 32 engage and yieldingly press against the ground as shown in Fig. 3.

Each pair of rings 32 is rotatably confined between the proximate side of the middle portion 13 of the housing and adjacent collar 18 and as a result the engagement of the rings with the ground effectively checks and prevents sidewise skidding of the vehicle. At the same time the rings are free to roll forwardly over the ground if, as is usually the case, the vehicle is moving forward when the anti-skid mechanism is thrown into action.

It will also be clear that while the rings 32 are in engagement with the ground and the vehicle is moving forward, the springs 22 will function to maintain the rings continuously in engagement with an uneven roadway.

What I claim is:

1. In an automobile, in combination, a rear axle housing; an eccentric rotatably mounted on said housing so as to swing on the axis of the latter toward and from the ground; a ring member rotatably mounted upon said eccentric and adapted to have rolling engagement with the ground when said eccentric is swung downwardly thereby to hold the vehicle against skidding sidewise; a gear compounded with said eccentric and rotatable on the axis of said housing, and means operable by the driver of the vehicle for rotating said gear and eccentric, said means including an endwise movable toothed rack-bar slidably supported by said housing and engaging said gear.

2. In an automobile, in combination, a rear axle housing; an eccentric rotatably mounted on said housing so as to swing on the axis of the latter toward and from the ground; a ring member rotatably mounted upon said eccentric and adapted to have rolling engagement with the ground when said eccentric is swung downwardly thereby to hold the vehicle against skidding sidewise; a gear compounded with said eccentric and rotatable on the axis of said housing, and means operable by the driver of the vehicle for rotating said gear and eccentric, said means including an endwise movable toothed rack-bar slidably supported by said housing and engaging said gear, a manually operated member accessible to the driver of the vehicle, and mechanism including a spring through which movement of said manually operated member in one direction acts to swing said eccentric downwardly and to hold said ring member yieldingly against the ground.

FRED M. MOODY.